United States Patent Office
3,548,161
Patented Dec. 15, 1970

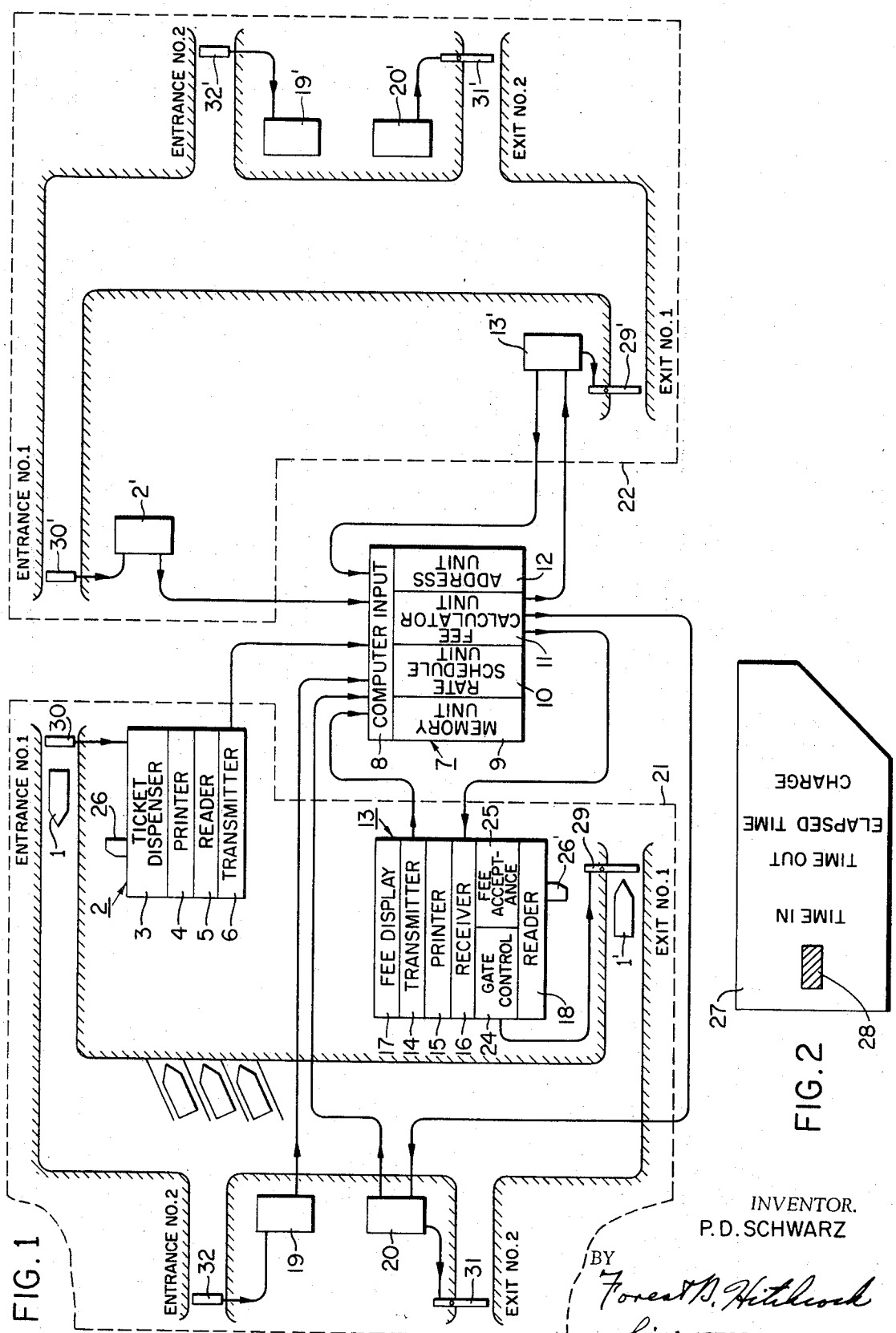

3,548,161
VEHICLE PARKING TIME AND FEE COMPUTING SYSTEM
Peter D. Schwarz, Rochester, N.Y., assignor to General Signal Corporation, Rochester, N.Y., a corporation of New York
Filed Jan. 5, 1967, Ser. No. 606,958
Int. Cl. G06k 17/00
U.S. Cl. 235—61.6                                     8 Claims

ABSTRACT OF THE DISCLOSURE

A system for computing vehicle parking time and charge using a central computer. Entrance apparatus issues a magnetically identified ticket having vehicle entrance time thereon and sends the identification and time to the computer storage. Exit equipment reads the ticket identification and sends it with the exit time to the computer wherein time and charge are calculated. Exit receiving equipment displays the time and charge to the operator.

BACKGROUND OF THE INVENTION

The present invention relates to a system for determining the elapsed time and fee associated with vehicle parking, and more particularly it relates to a fee and elapsed time computing system utilizing a central computer. Parking facilities which charge on a time basis generally rely for determination of proper parking fee on either direct operator computation based upon simple time-in and time-out stamping or electro-mechanical computation. The former method depends upon the mental computations of the parking facility or gate attendant to arrive at a parking charge. This method is greatly complicated by the complex and varied rate schedules and formulas employed by different parking facilities. When computing the amount due in accordance with the rate schedules frequent error, particularly during peak business periods, occur. This not only causes losses to the facility proprietor but also tends to cause customer dissatisfaction. Moreover, such a system is fraught with possibilities for improper fee extraction and income reporting.

Electro-mechanical computation using computing apparatus at each point of egress overcomes many disadvantages of direct operator control. Such systems, however, still possess a number of disadvantages; if the facilities contain a multiplicity of exit gates each must have associated with it a computation device, such redundancy of equipment produces serious cost and continuing maintenance and reliability problems. Moreover, this type of system is not easily adaptable to expansion of the parking facility or normal variations in the use of such facility, nor can it be readily applied to such ancillary functions as bookkeeping, billing, etc.

SUMMARY OF INVENTION

The system of this invention obviates the aforementioned difficulties associated with existing apparatus. A central computer unit, possessing storage and arithmetic units, receives and maintains entrance time with identification information for each vehicle using the parking facility. Upon exit, of the vehicle, the computer, conditioned by a programmed rate schedule, calculates both the fee due and the elapsed time based on the entrance time, retrieved by its association with the vehicle identification, and the exit time. Operation and actuation of the system is controlled by a ticket or other equivalent keying apparatus issued to the vehicle operator when entering the parking facility. Ticket dispensing, printing, reading, and transmitting units are maintained at each point of ingress and ticket reading, printing, receiving, transmitting, fee display, gate control, and fee acceptance units are located at each exit. Depending upon choice of fully automatic or semi-automatic control an operator may or may not be stationed at each exit, semi-automatic operation requiring an operator, fully automatic operation not requiring an operator.

An object of this invention is to provide an improved parking time and fee computing system.

Other objects and features will become obvious upon reading and study of the detailed description of this invention and the exemplary embodiments contained in the drawings.

BRIEF DESCRIPTION OF THE DRAWINGS

Referring to the drawings:

FIG. 1 shows a functional block diagrammatical representation of an automatic multiple exit and entrance system for use with a plurality of parking facilities.

FIG. 2 shows a typical ticket format for use with this invention.

It is to be understood that the embodiments contained in the drawings are illustrative and the invention is not to be restricted to these embodiments but rather covers a complete range of possible system configurations ascertainable from the present disclosure. It is further to be understood that no attempt has been made to show the actual intricacies of computer operation and arrangement; any individual, reasonably cognizant of computer art is capable of organizing and programming a computer to achieve the scope and range of operation required for use with this invention.

This invention is an improvement over my prior Pat. No. 3,317,892, resulting from an application filed Oct. 21, 1963, to which reference can be made for a detailed circuit organization that can be used to control remotely the printing of information such as addresses, time of passage of vehicles through entrance and exit gates, the amount of the computed fares, and the like. Data processing systems are well known for responding to a plurality of inputs having memory and data processing units that can be programmed by persons skilled in the art to meet the requisites of the present invention. One such system for example, is disclosed in the MacDonald et al. Pat. No. 3,344,401 resulting from an application filed Mar. 15, 1963.

DESCRIPTION OF THE PREFERRED EMBODIMENTS

Referring to FIG. 1 showing parking facilities 21 and 22 having a plurality of entrances and exits, entrance apparatus 2 located at Entrance Number One contains a dispenser mechanism 3 for issuing a ticket, a printer mechanism 4 for stamping desired information, a reader 5 for interpreting and sensing information indicated on the ticket, and a transmitter 6 for sending data to the central computer 7. Entrance Number Two apparatus 19 is shown to demonstrate a system organization having more than a single point of entrance. The equipment of Entrance Number One is typical of that located at all other entrances e.g., Entrance Number Two; thus apparatus 19 is equivalent to apparatus 2 and treadle 32 to treadle 30. At Exit Number One, exit apparatus 13 contains a reader 18 for scanning the ticket 26' and recognizing data contained thereon, a printer 15 for stamping additional information, a fee display unit 17 for showing the amount charged and the elapsed parking time, a transmitter 14 conditioned by a peculiar address coding for conveying data to the computer 7, a receiver 16 responsive to the peculiar address code of its associated exit apparatus 13 for sensing information sent from the computer 7, gate control apparatus 24 and a fee acceptance device 25. Similarly to the illustrated equipment deployment of a plurality of entrance units, exit apparatus 20 is shown for Exit Number Two and is typical of exit apparatus contained at any other points of egress not shown, hence apparatus 20 is equivalent to apparatus 13 and both are associated with exit gates 31 and 29 respectively. The entrance and exit equipment of parking facility 22 are representative of that shown for facility 21 and their equivalency is indicated on the drawings by repetition of the same number designation accompanied by a prime (') accent.

The computer 7, situated remotely of the parking facility entrance-exit apparatus, calculates and determines the parking time and charge based on data received and communicates time and charge to the proper exit points. The computer 7 contains a computer input 8, a memory unit 9, a rate schedule unit 10, a fee calculator unit 11 and an address unit 12.

The ticket 26 is shown as issued to a vehicle 1 operator upon ingress to the parking facility 21 at Entrance Number. The ticket is again shown as eventually inserted into the exit apparatus 13 upon egress of the vehicle from Exit Number One. The latter positions of the vehicle and ticket are identified by 1' and 26' respectively so as to indicate the same members having different locations in the system at subsequent times. An exit gate 29 either impedes or permits passage of a vehicle depending upon its control command.

Briefly in operation of the system, a vehicle 1 enters the parking facility 21 and is sensed by an entrance detector 30. Entrance apparatus 2 responsive to the entrance detector 30 issues a ticket 26 having identification and entrance time data thereon and sends this information to the computer 7. At a later time, depending upon the parking time consumed, the vehicle 1' approaches the exit gate 29 and the ticket 26' is inserted into the exit apparatus 13. This actuates responsive mechanisms and the ticket is scanned for its identification and printed with exit time information. The identification and exit time are transmitted to the computer 7; the computer digests this data and in accordance with the entrance information retrieved from its memory unit 9 calculates, based upon the rate schedule unit 12 programming, and transmits the fee and elapsed parking time to the exit apparatus 13 for display. Extraction of the fee results in the allowance of vehicle passage.

To enable incisive and detailed knowledge and analysis of the system and its various modes of operation, the exact functioning of each unit will be considered in view of its utilization with a single vehicle. For semi-automatic operation, as shown in FIG. 1 and as outlined in the preceeding paragraphs, the vehicle 1, enters the parking facility 21, and is sensed by an entrance detector 30. The operator of the vehicle 1 takes into his possession a ticket 26 automatically dispensed by the dispenser unit 3. Dispensing of the ticket 26 is actuated by the entrance detector 30; any number of well known devices may be adapted to perform this function, e.g., treadles, photoelectric sensors, sonic detectors, inductive loops, etc. The ticket 26 as dispensed has markings specifying the time of vehicle entry and identification of the ticket. The identification indicia may be preprinted on the ticket or printed at the time of issue; it is preferable for utilization in the embodiment of the invention shown, that this identification be preprinted to avoid the hazards of environment and equipment reliability associated with on-the-spot printing. The preferred form of marking used in this invention is a magnetized printed character but is not limited to this and may consist of other well known forms of automatically readable indicia, e.g., punched holes. The printer 4, containing a clock mechanism, indicates the vehicle entry time on the ticket 26; the identification is scanned by a reader 5 and sent in conjunction with the time to the computer 7 by transmitter 6. The transmitter 6 information is controlled by the printer 4, with respect to time, and the reader 5 for identification. The reader 5 comprises a scanning device such as a magnetic head for sensing the identification markings. Should both the entrance time and identification markings be printed at time of ticket 26 issue, then a reader 5 need not be incorporated. The information is transmitted to the computer input 8 and the time is stored in the computer memory unit 9 in coordination with its identification indicia. The computer memory unit 9 electronically holds the entrance time in a retrievable form available upon request by association with the correct ticket identification.

The vehicle 1 operator after obtaining the ticket 26 proceeds to park the vehicle 1 for a desired interval. When the operator desires to remove the vehicle 1 from the parking facility, he proceeds to a point of egress typically shown and indicated as Exit Number One. Upon arrival at the exit the vehicle 1' is positioned relative to the exit gate 29 and the operator conveys the ticket 26' to the exit attendant. The ticket 26' is inserted into exit apparatus 13 and there inscribed with the exit time by actuation of the exit printer 15 clock mechanism. The identification indicia present on the ticket is scanned by the reader 18 and the transmitter 14, controlled by the reader 18 and the printer 15, communicates the exit time and ticket identication in conjunction with an address code peculiar to the exit station to the computer input 8. The receiving of this data by the computer 7 immediately actuates the fee calculator unit 11 and registers the address of the exit station in the address unit 12. The identification indicia is used to retrieve the entrance time from the memory unit 9 and such entrance time with the exit time provides sufficient information for the fee calculator 11, as programmed by the rate schedule unit 10, to electronically compute the correct fee and elapsed parking period. The rate schedule unit 10 programs the computer providing the rate schedules and formulas applicable to the parking facility and time intervals and hours involved.

The parking fee and the consumed time information are then transmitted to the exit station, identified by the address registered in the address unit 12, and are accepted by the receiver 16. The fee is displayed on the fee display unit 17 and if so desired, printed on the ticket 26' along with the elapsed time by the printer 15 mechanism which is responsive to the receiver 16, i.e., the printer 15 is controlled by the signals transmitted to the receiver 16 from the computer 7 as well as responsive to its clock mechanism for stamping exit time. After payment of the amount required, the attendant opens the gate 29 and egress of the vehicle is permitted.

The same apparatus is operable with a plurality of entrances and exits and is similarly adaptable to any number of vehicles, it is only limited by the capacity and speed of the computer 7 and to this extent may be considered as unlimited with respect to present day parking facilities. Understanding of the operable features of this system may be aided by realizing that the touchstone of system operation is the ticket 26, with its identification markings. Entry time is retrieved from the computer memory in accordance with the identification contained on the ticket 26'; the fee computation is initiated upon its insertion into the exit equipment. A typical format for a ticket is shown in FIG. 2, on this ticket 27 is a preprinted magnetized identification number 28, entrance and exit time and parking fee due. The ticket is keyed for proper insertion into the exit apparatus. This format should satisfy most parking facility control requirements.

The embodiments of this invention suitable for use with a number or plurality of parking facilities is also exemplified in FIG. 1. Shown is a remotely located computer 7, capable of storing information and calculating parking fees for a multiplicity of parking facilities typically represented by facilities 21 and 22, operating basically in the same manner as the system just described. It must, however, have amplified capacity with regard to memory, rate schedules, and address registration for the added facilities. The computer 7 receives vehicle identification and entrance time information for each vehicle entering any of the parking facilities. From the entrance apparatus shown in FIG. 1 as 2, 19, 2' and 19'; storage of the information is again in accordance with the particular identification and if desired may be coordinated with a particular parking facility address. When the vehicle or vehicles leave the parking facility the exit units 13, 20, 13' and 20' transmit to the computer, exit time, vehicle identification, and exit address information. The computer 7 from this information retrieves the entrance time from the computer memory unit 9 and the fee calculator unit 11, conditioned by the rate schedule unit 10, computes the amount to be charged and elapsed parking time. The rate schedule unit 10 must provide a plurality of schedules if all facilities do not use the same rates. If this is the case, the rate schedule unit 10 must be organized so as to recognize the registered facility exit address and to properly condition the computer in accordance with it. The computations are then transmitted to the parking facility and exit determined by the address code registered in the address unit 12, where in similar fashion to the system for a single parking facility, it is used for fee and time display. Thus, it is seen that a single computer of sufficient capacity may be utilized for a large number of parking facilities each having a multiplicity of entrance and exit points. Such a system may be particularly adaptable to large or municipal parking facilities maintained and controlled by a single authority or agency.

Both the single and multiple parking facility illustrated in FIG. 1 are organized to permit completely automatic unmanned operation. The gate control 24 and fee acceptance 25 units are added to exit apparatus 13 to achieve the desired automatic system. After computation of the fee and elapsed time by the computer 7, the fee acceptance mechanism 25 is controlled by the fee display unit 17 to accept only the amount indicated before instigating the gate control unit 24 to open the exit gate 29. After the vehicle operator deposits the proper fee, the fee acceptance unit 25 initiates the gate control mechanism 24 to open the control gate 29 and the vehicle is permitted exit. The gate control unit 24 and fee acceptance unit 25 can also be used in semi-automatic operation to insure proper fee payment before the attendant can allow egress of the vehicle. Other ancillary features, which may be included in the type of system described, are operation with credit cards, long term parking, automatic billing and bookkeeping, etc. Incorporation of these operational facets may be accomplished with a minimum of equipment and computer re-organization. The credit card operation necessitates modification of the exit apparatus by addition of a credit card unit wherein card insertion satisfies the indicated charge and allows a gate 24 actuation; the card identity is recognized and transmitted to the computer to be used in conjunction with the fee for billing purposes.

The foregoing descriptions and embodiments of this invention are presented to enable understanding of the method and equipment utilized. It is fully realized that a study of the disclosure and the exemplary embodiments shown by one skilled in the art may suggest additional variations and adaptations of the basic system; it is therefore intended that the invention contain within its scope and spirit all those modifications obvious to one skilled in the art.

What is claimed is:

1. A vehicle elapsed parking time and fee computing system for use with one or more parking facilities each having one or more exits and entrances, comprising, in combination, detector means for sensing entry of a vehicle into a parking facility, entrance apparatus actuated by said sensing means for dispensing a ticket having identification indicia imprinted thereon and for indicating the entrance time of said vehicle, computer memory means responsive to said entrance apparatus for storing said entrance time in accordance with said identification indicia, exit apparatus having a peculiar address actuated when said ticket is inserted for indicating the exit time of said vehicle and for recognizing said identification indicia, computer fee calculating means operatively responsive to said exit apparatus for registering said peculiar address and for determining the elapsed parking time and charge based upon the entrance time retrieved from said computer memory means by association with said identification indicia and said exit time in accordance with a predetermined rate schedule, fee display means operatively responsive to said registered peculiar address and controlled by said fee calculating means for indicating said elapsed parking time and charge, and egress control means for allowing passage of the vehicle upon payment or acceptance of charges of the indicated fee.

2. The combination of claim 1 wherein said identification indicia consists of pre-printed magnetic characters.

3. The combination of claim 1 wherein the entrance apparatus comprises, dispensing means actuated by said detector means for issuing the ticket, clock means for determining the time when said ticket is issued, reader means for scanning said ticket when issued and for recognizing said identification indicia, printer means responsive to said clock means for stamping on said ticket the time when actuated by said dispensing means, and transmitter means responsive to both said printer means and said reader means for sending said identification indicia and said time to the computer memory means when said ticket issues.

4. The combination of claim 1 wherein the exit apparatus comprises, exit reader means for scanning said ticket and for recognizing said identification indicia, exit clock means for determining the exit time when said ticket is scanned, exit printer means responsive to said clock means for stamping the exit time on said ticket as it is scanned, and exit transmitter means operatively responsive to both said exit reader means and said exit printer means for communicating said exit time and said identification indicia with a peculiar address code to the computer fee calculating means after said ticket is scanned and printed.

5. The combination of claim 1 wherein the fee display means comprises, means operatively responsive to said peculiar address for receiving from said computer fee calculating means the elapsed parking time and charge, and fee printer means responsive to said means for stamping said ticket with said elapsed parking time and charge.

6. The combination of claim 1 wherein the egress control means comprises, gate control means for allowing passage of said vehicle, and fee acceptance means controlled by said fee display means for actuating said gate control means upon receiving of said indicated charge.

7. The invention of claim 6 wherein said fee acceptance means includes credit card means for actuating said gate control means, and for transmitting said credit card identity to said central computer for billing purposes.

8. A computer controlled elapsed parking time and charge computing system for use with one or more parking facilities each having one or more exits and entrances, comprising, in combination, detector means for sensing the entry of a vehicle into a parking facility, dispensing means actuated by said detector means for issuing a ticket having identification indicia consisting of magnetic characters preprinted thereon, clock means for determining the time when said ticket is issued, reader means for scanning said ticket when issued and for recognizing said identification indicia, printer means responsive to said clock means for stamping on said ticket the time when actuated by said dispensing means, transmitter means responsive to both said printer means and said reader means for sending said identification indicia and said time to the computer when said ticket issues, computer memory means responsive to said transmitter means for storing said time in coordination with said identification indicia, exit reader means for scanning said ticket and for recognizing said identification indicia when said ticket is inserted, exit clock means for determining the exit time when said ticket is scanned, exit printer means responsive to said clock means for stamping the exit time on said ticket as it is scanned, exit transmitter means operatively responsive to said exit reader means and said exit printer means for communicating said exit time and said identification indicia with a peculiar address code to the computer after said ticket is scanned and printed, computer fee calculating means operatively responsive to said exit transmitter means for registering said peculiar address code and for determining the elapsed parking time and charge based upon the entrance time retrieved from said computer memory means by its association with said identification indicia and exit time in accordance with a predetermined rate schedule, means operatively responsive to said peculiar address code for receiving from said computer fee calculating means said elapsed parking time and charge, fee printer means responsive to said receiver means for stamping said ticket with said elapsed parking time and charge, means for allowing passage of said vehicle, and fee acceptance means controlled by said receiver means for actuating said means upon satisfaction of said indicated charge.

References Cited

UNITED STATES PATENTS

| | | | |
|---|---|---|---|
| 2,910,238 | 10/1959 | Miles et al. | 340—153X |
| 3,057,422 | 10/1962 | Cunningham et al. | 235—92 |
| 3,105,221 | 9/1963 | Schwarz | 235—92 |
| 3,322,940 | 5/1967 | Barker et al. | 235—92UX |

DARYL W. COOK, Primary Examiner

U.S. Cl. X.R.

340—55